United States Patent

Wegner

(10) Patent No.: US 9,670,075 B1
(45) Date of Patent: Jun. 6, 2017

(54) PROCESS FOR NITRATE REDUCTION FROM WATER

(71) Applicant: Paul Wegner, San Carlos, CA (US)

(72) Inventor: Paul Wegner, San Carlos, CA (US)

(*) Notice: Subject to any disclaimer, the term of this patent is extended or adjusted under 35 U.S.C. 154(b) by 392 days.

(21) Appl. No.: 14/455,360

(22) Filed: Aug. 8, 2014

Related U.S. Application Data

(60) Provisional application No. 61/958,875, filed on Aug. 8, 2013.

(51) Int. Cl.
| | |
|---|---|
| *C02F 1/28* | (2006.01) |
| *B01J 49/00* | (2017.01) |
| *C02F 1/42* | (2006.01) |
| *C02F 101/16* | (2006.01) |
| *C02F 103/00* | (2006.01) |
| *B01J 49/57* | (2017.01) |
| *B01J 49/07* | (2017.01) |

(52) U.S. Cl.
CPC .............. *C02F 1/42* (2013.01); *B01J 49/07* (2017.01); *B01J 49/57* (2017.01); *C02F 2001/422* (2013.01); *C02F 2001/425* (2013.01); *C02F 2101/163* (2013.01); *C02F 2103/001* (2013.01); *C02F 2303/16* (2013.01)

(58) Field of Classification Search
CPC C02F 1/42; C02F 2001/422; C02F 2001/425; C02F 2101/163; C02F 2103/001; B01J 49/07; B01J 49/57
See application file for complete search history.

(56) References Cited

U.S. PATENT DOCUMENTS

| | | | | |
|---|---|---|---|---|
| 3,775,088 | A * | 11/1973 | Higgins | C05C 1/00 210/676 |
| 2007/0114178 | A1* | 5/2007 | Coppola | B01J 41/046 210/660 |
| 2008/0156732 | A1* | 7/2008 | Kearney | B01J 39/043 210/673 |
| 2010/0147767 | A1* | 6/2010 | Grott | B01J 47/028 210/670 |

OTHER PUBLICATIONS

U.S. Environmental Protection Agency; EPA-600/2-78-052; Jun. 1978; 310 Pages; Nitrate Removal From Water Supplies by Ion Exchange by Dennis A. Clifford and Walter J. Weber, Jr., of The University of Michigan, Ann Arbor, Michigan 48109; Grant No. R-803898; Project Officer Thomas J. Sort, Water Supply Research Division U.S. EPA, Cincinnati, OH 45268.

* cited by examiner

*Primary Examiner* — Matthew O Savage
(74) *Attorney, Agent, or Firm* — Head, Johnson, Kachigian & Wilkinson, PC

(57) ABSTRACT

A system and process for nitrate reduction from a water source. The process includes the steps of passing nitrate contaminated water through a strong acid cation exchange resin to reduce cations. The effluent is thereafter passed through a weak base anion exchange resin in order to reduce nitrate content. The strong acid cation exchange resin is regenerated, and the weak base anion exchange resin is also regenerated.

11 Claims, 2 Drawing Sheets

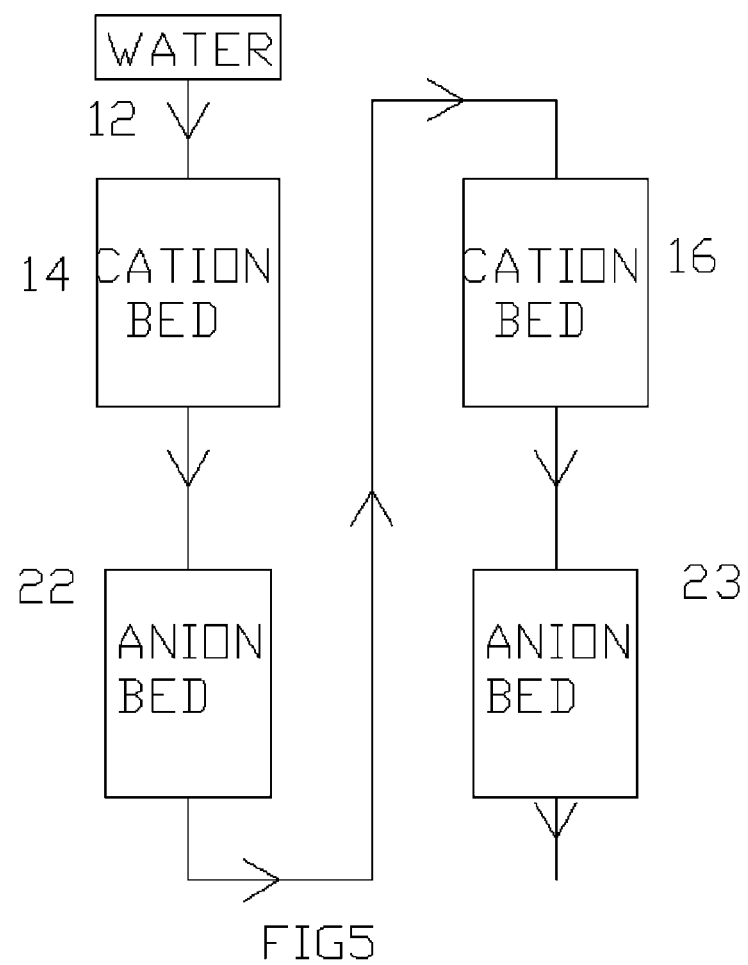

PROCESS FOR NITRATE REDUCTION FROM WATER

CROSS REFERENCE TO RELATED APPLICATIONS

This application claims priority to U.S. Provisional Application Ser. No. 61/958,875, filed Aug. 8, 2013, which is incorporated herein by reference.

BACKGROUND OF THE INVENTION

1. Field of the Invention

The present invention is directed to a process to remove nitrates from a water source. In particular, the present invention is directed to a process of passing nitrate contaminated water through a strong acid cation exchange resin and thereafter passing the effluent through a weak base anion exchange resin in order to reduce nitrate content while reducing hardness and reducing dissolved solids in the resulting water.

2. Prior Art

Many water sources contain excessively high levels of nitrate, hardness and salt, which makes the water unsuitable for domestic, industrial and agricultural use. Runoff and wells in agricultural areas are especially high in nitrate, hardness and salt. It is desirable to reduce all three, while producing secondary product streams.

Salt is one of the most expensive chemicals to remove from water. In addition, the resulting concentrated salt brine is difficult and expensive to dispose of Producing commercial grade sodium chloride or returning the salt to the ocean is quite expensive. A major source of salt pollution is water softeners. Therefore it is desirable to produce soft water without the use of chemicals that contain chloride or sodium ions.

Two common methods of removing nitrate are: ion exchange and biological denitrification.

Denitrification destroys the nitrate fertilizer while failing to reduce the hardness or salinity of the water. In addition, it introduces a host of organic materials into the water, which adds to water treatment cost. Biological denitrification requires monitoring to insure bacterial health. The biological denitrification requires large expensive equipment. It also requires a carbon source such as methanol or sugar, to support the bioremediation process.

Ion exchange uses a strong or weak base ion exchange resin in chloride form. It exchanges chloride for nitrate and sulfate, which increases the chloride concentration of the treated water. Regeneration requires a large excess of sodium chloride. Therefore the regeneration brine waste contains excessively high amounts of sodium and chloride; which makes it unacceptable as a fertilizer while costly and difficult to dispose of.

Typical regeneration methods yield several bed volumes of salt brine, which is too dilute for practical transport. Therefore, the salt brine must be concentrated using various methods such as distillation or reverse osmosis. Complete regeneration of weak base ion exchange usually requires a large excess of ammonia and several bed volumes of rinse water.

Nitrates are usually removed from water using a strong base anion ion exchange resin which is regenerated with a large excess of salt. The resulting brine is a dilute mixture of mostly sodium chloride and a minor amount sodium nitrate The low fertilizer concentration and high salt content make it unacceptable as fertilizer. This waste brine must be transported disposed in deep salt water injection wells at great expense. Plus the waste brine presents a long term environmental risk.

Strong acid resin and weak base resin have been used to remove nitrate, but have failed to produce a byproduct that has commercial value. Others have added acid to the water before passing it through a weak base resin to improve nitrate removal. This comes at the cost of reduced nitrate removal capacity if sulfuric acid is used. If hydrochloric acid is used, the resulting fertilizer and product water is higher in chloride. However, this increases the total dissolved solids (TDS) of the water and actually compromises nitrate removal by adding competing ions such as chlorides. Some have removed hardness from the water to improve nitrate removal. However, the water softener produces waste brine that is high in salt and adds sodium to the water.

Nitrate are removed with reverse osmosis and once again there is the issue of the waste which is even higher in nitrate and salt. Reverse osmosis waste is usually greater than traditional ion exchange waste. It is too dilute and too high in non nitrate salts to have any fertilizer value. So it must be transported and disposed of as hazardous waste.

Nitrates are also removed from high nitrate water sources through biological means which produces nitrogen gas that has no economic value. Biological methods require long residence times, which translates into very large water treatment facilities. Plus, they produce a wide variety of organic environmental pollutants. Many denitrification plants also require an expensive carbon source such as methanol, glycerin or sugar to work properly.

Notwithstanding the foregoing, there remains a need for a system and process to remove nitrates including passing nitrate contaminated water through a strong acid cation exchange resin followed by passing through a weak base anion exchange and including regeneration procedures.

Further, there remains a need for a system and process for nitrate reduction which includes regeneration of the ion exchange resins to produce high value by products.

SUMMARY OF THE INVENTION

The present invention is directed to a system and process for nitrate reduction from water. In the process of the invention, nitrate contaminated water is delivered into and through a strong acid cation exchange resin bed. Thereafter, the effluent is passed into and through an anion weak base exchange resin bed. The effluent may optionally pass through an additional strong acid resin bed which is followed by a weak anion bed.

The cation exchange bed or beds are periodically regenerated with an acid, such as sulfuric acid. Regeneration with sulfuric acid produces gypsum which is utilized as a common soil amendment.

Additionally, the anion exchange bed is periodically regenerated to produce a concentrated fertilizer. The weak base resin is regenerated with a low excess of ammonia and low volume rinse water by mixing the ammonia with regeneration products from a previous regeneration cycle.

BRIEF DESCRIPTION OF THE DRAWINGS

FIG. 5 is a simplified schematic diagram showing preferred configuration which allows the first pair of beds to be fully exhausted while maintaining low nitrate in the effluent.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
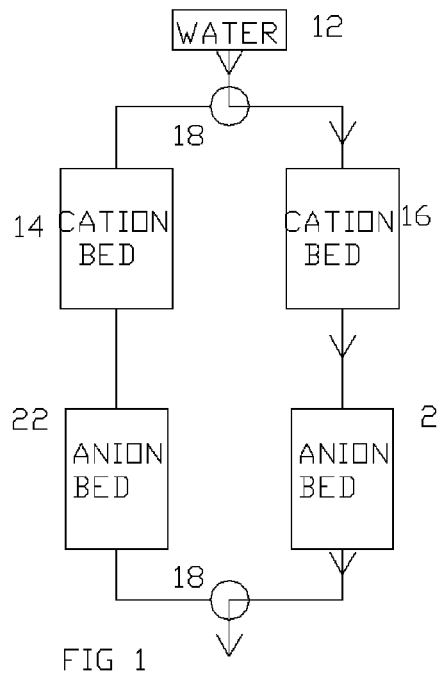
FIG. 1 is a simplified diagrammatic flowchart of the process for nitrate reduction from water where one pair of beds is in service while the other is in regeneration mode. The valves are three-way.

Referring to the drawings in detail, FIG. 1 illustrates a simplified schematic diagram flowchart of the process of the present invention.

Nitrate contaminated water 12 is delivered into and through a first strong acid cation exchange resin bed 14.

The ion exchange resin or polymer is typically a support structure in the form of small beads which are fabricated from organic polymer substrates. The beads are typically porous in order to provide a high surface area. In some cases, the ion exchange beads are composed of cross-linked polystyrene.

In one preferred arrangement, a macroporous polystyrene sulfonate bead is utilized, such as Purolite C160™, manufactured by the Purolite Company. Purolite C100™, a gel type strong acid resin also may be utilized with acceptable performances.

After exchange through the first bed 14 the effluent passes through the anion exchange bed 22. The effluent may pass through a second set of beds—a strong acid bed 16 and anion exchange bed 23, to allow the first beds to be fully exhausted.

A more traditional approach is shown in FIG. 1 where either pair of beds maybe removed from service with a pair of three way valves 18 for regeneration while the other pair remains in service.

A valve or valving 18 may be employed to bypass the cation exchange bed 16. Thereafter, the effluent water may be passed to an anion or a weak base anion exchange resin bed 22.

Figure 2:
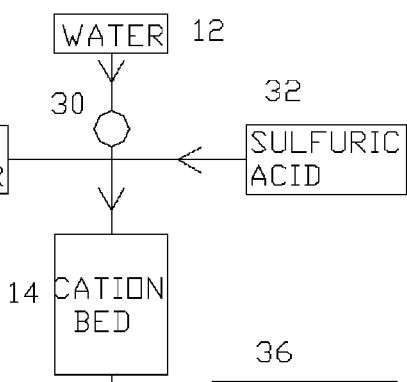
FIG. 2 is a simplified schematic diagram showing the cation bed in regeneration.

FIG. 2 illustrates a schematic diagram of the process for regeneration of the cation exchange bed 14. As in FIG. 1, the nitrate contaminated water is shown delivered into and through the cation exchange bed 16. In order to regenerate the bed, the bed 14 is taken out of service through valves 18 or other mechanism.

The exhausted strong acid resin bed may be regenerated with an acid such as sulfuric acid 32 or hydrochloric acid. Regeneration of the sulfuric acid produces gypsum which is a common soil amendment. In one example, dilute sulfuric acid (5%) is introduced at the top of the cation exchange bed or column over a 90 to 180 minute period. This is followed by rinsing with one or two bed volumes of product water over a five to eight hour period. The initial output from the cation exchange bed or column during this regeneration process contains process water which may be returned for reprocessing. This volume is typically about one-half of a bed volume. The remaining water may be passed through a limestone bed 36 in order to neutralize any excess acid. The regeneration byproduct thereafter is calcium sulfate and magnesium sulfate which may be used as a soil conditioner.

The cost of the sulfuric acid exceeds the value of the calcium sulfate produced. However, it is widely used as a soil conditioner in agriculture. Therefore, no disposal costs are incurred.

Figure 3:
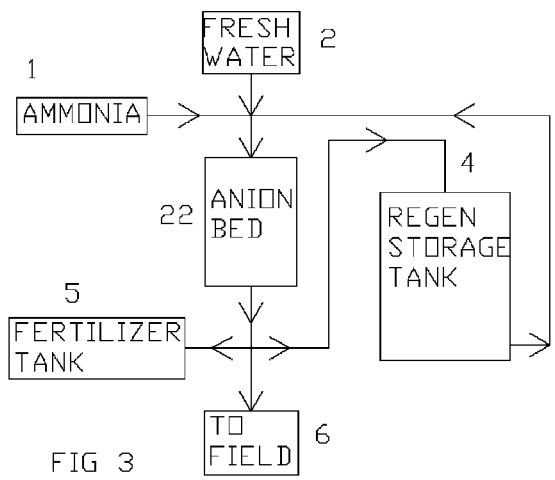
FIG. 3 is a simplified schematic diagram showing the anion exchange bed in regeneration.

FIG. 3 is a simplified schematic diagram of the process to regenerate the anion exchange bed 22.

Sodium chloride is a known popular choice to regenerate the weak base resin.

It is cheap and safe to use. Generally, however, since a large excess is usually required for regeneration, as much as a fourfold excess to restore the resin to 75% of its capacity. Nitrate selective anion resins are exceptionally difficult to restore to full capacity. Therefore one needs five to six pounds of salt for each pound of nitrate removed. In addition, there is the large cost of regeneration waste disposal, since the brine has no commercial value and is hazardous.

Ammonia has been selected to regenerate the weak base resin, which is less safe to use than sodium chloride. However, it produces ammonium nitrate as byproduct which has value greater than the cost of the ammonia used for regeneration since each pound of ammonia produces 4.7 lbs. of ammonium nitrate. Since the price of the ammonia and ammonium nitrate per pound are about the same, the net economic gain is 3.7 fold.

Regeneration with concentrated ammonia is normally quite difficult because the density of ammonia water is less than water. Therefore, when it is followed with pure rinse water which has a high density, the ammonia continues to float to the top. One must increase the flow of rinse water to counter this floating problem, which in turn reduces resin contact time. This reduces the amount of resin restored to full capacity. This is usually countered by using excess ammonia or very dilute ammonia solutions and/or very fast rinse flows.

The end result is excessive ammonia consumption, an unacceptably dilute fertilizer, and incomplete regeneration of the anion bed.

The present invention restores the column with low excess of ammonia and low volume rinse water by mixing the ammonia with the regeneration products (ammonium nitrate and ammonium sulfate) from the previous regeneration cycle or other alkaline chemicals such as potassium carbonate, potassium hydroxide, sodium carbonate, or sodium hydroxide, which yields a regeneration solution with a density similar to or greater than water. This prevents the ammonia from floating at any regeneration flow rate. Since the mixture is denser than water, one can slowly and efficiently displace the regeneration byproducts from the column.

Mixing a portion of the regeneration product from a previous regeneration cycle serves two purposes, it increases the density of the ammonia solution and increases the concentration of the regeneration byproducts (ammonium nitrate and ammonium sulfate).

Referring in particular to FIG. 3, a process is shown for regeneration of the anion bed.

Step One:

Pump liquid from previous regeneration cycle out of regeneration storage tank (4) and combine with ammonia (1). Pass resulting mixture through an anion bed (22) The collect initial output for use on field (6) or return to process water (12). When fertilizer is detected via conductivity or pH meter, collect the output into the fertilizer tank (5) until regeneration storage tank (4) is empty.

Step Two:

Pump fresh water (2) into anion bed to rinse off ammonia/ammonium salt mixture and collect output into regeneration storage tank (4) until tank is full.

Step Three:

If any additional rinsing is required to remove last traces of ammonia, collect the output for field (6) application.

AND/OR

Figure 4:
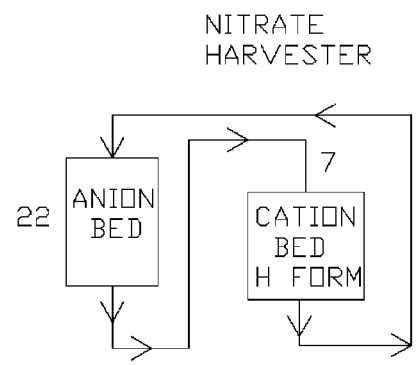
FIG. 4 is a simplified schematic diagram showing the anion bed in closed loop configuration to remove the last traces of ammonia.

Recirculate between anion bed and cation bed in hydrogen form in closed loop fashion which removes the last traces of ammonia as shown in detail in FIG. 4.

The regeneration procedure is typical in a regeneration anion exchange resin

|  | Prior Art | Invention | % increase/decrease |
|---|---|---|---|
| Total BV volumes of regeneration waste: | 12 | 0.75 to 1.5 | 88% to 94% |
| Total Regeneration time minutes: | 105 | 400 to 900 | 400% to 900% |
| Concentration of Ammonium Nitrate: | 1% | 10% to 20% | 10,000% to 20,000% |

Regeneration waste volume is reduced by 94%, while increasing ammonia nitrate concentration by 20 fold. However, this accomplished by increasing the regeneration time by 400% to 900% over the prior art.

Shipping 1% fertilizer would be cost prohibitive.

This illustrates the dramatic removal of various ions that the prior art does not accomplish.

This accomplished by very efficient regeneration while maintaining a very low regeneration output volume INVENTION values are shown in PPM. OUTPUT after four hours of processing.

|  | TDS | Hardness | NO3 | SO4 | Cl | Na |
|---|---|---|---|---|---|---|
| INPUT: | 2000 | 770 | 290 | 350 | 568 | 435 |
| OUTPUT: | 20 | 5 | 1.6 | ND | 1.1 | 4.2 |
| % removal: | 99% | 99% | 99% | 100% | 99% | 99% |

Example 1

One part 30% ammonia solution is mixed with two parts 10% ammonium sulfate to produce a regeneration chemical mixture with a density of 1.01.

While a density of greater than one is preferred, any increase in density improves performance over 30% ammonia with a density of 0.895.

Mixing one part 29% ammonia and two parts 6% potassium carbonate yields similar results.

The ammonia salt mixture reacts with the nitrate and sulfate as it flows down the anion column, to produce a concentrated ammonium sulfate/ammonium nitrate mixture.

The very first portion of liquid leaving the column is displaced water so it can be added to the product water or returned for reprocessing in the service mode. This is approximately ¼ to ½ a bed volume. The ½ to 1 bed volume is harvested as concentrated fertilizer (about 8% to over 20%). Approximately one bed volume is stored and used to combine with the ammonia in the next cycle. Any additional volume produced is used to fertilize fields.

It is sometimes difficult to remove the last traces of ammonia from the anion column after regeneration. Normal large volumes of rinse water are required. These last traces ammonia are readily removed by recirculating this water through a strong acid resin bed in hydrogen form and the anion bed in a closed loop fashion. After several passes, the ammonia is reduced to trace levels.

Example 2

Agricultural water containing over 500 ppm nitrate and a TDS of 3,500 ppm is passed through a 2 liter C160 strong acid cation exchange resin (Purolite) column, followed by a 2 liter A133 weak base anion exchange resin column, at a rate of 2 liters per minute. Effluent nitrate was less than 25 ppm.

Example 3

To demonstrate the effectiveness of weak base anion exchange regeneration, 0.18 moles of sulfuric acid in 2 liters of water over a 1 hour period were passed; through 0.2 liters of A133 anion exchange resin which a has capacity of 0.9 moles (1.8 H+ equivalents) sulfuric acid per liter. The TDS remained below 70 ppm, indicating a very low acid leakage.

The resin was regenerated with a mixture of 0.36 moles of ammonia (27% solution) and 100 ml of regeneration brine from a previous regeneration cycle, followed with 1 gram of 50% potassium hydroxide in 10 ml of water. This was followed by 400 ml of fresh water.

The first 100 ml had a TDS of 60 ppm.

The second 100 ml was 10% ammonium sulfate by weight.

The third 100 ml was 23% ammonium sulfate by weight.

The last fraction had a TDS of less than 100 ppm.

The regenerated column was challenged again with the same amount of acid. The TDS remained at 60 ppm.

It was challenged with an additional 0.09 moles of sulfuric acid (a 10% excess) and the TDS remained at 60 ppm. This clearly demonstrates that the column was restored to 110% of rated capacity.

Whereas, the present invention has been described in relation to the drawings attached hereto, it should be understood that other and further modifications, apart from those shown or suggested herein, may be made within the spirit and scope of this invention.

What is claimed is:

1. A process to remove nitrates from nitrate contaminated water, which process comprises:

passing the nitrate contaminated water through a bed of a strong acid cation exchange resin to remove cations from the nitrate contaminated water to produce an effluent;

passing said effluent through a bed of a weak base anion exchange resin in order to reduce nitrate and other anions in said effluent to produce product water;

collecting said product water which is lower in total dissolved solids, hardness and nitrates than said nitrate contaminated water;

periodically regenerating the strong acid cation exchange resin;

periodically regenerating the weak base anion exchange resin by passing a regenerant solution containing ammonia through the bed of said weak base anion exchange resin;

rinsing the bed of weak base anion exchange resin after a step of passing the regenerant solution through the bed of weak base anion exchange resin by passing a portion of said product water through the bed of weak base anion exchange resin;

collecting the portion of the process water that has passed through the bed of weak base anion exchange resin;

mixing ammonia with the collected portion of product water that has passed through the bed of weak base anion exchange resin; and passing the collected portion of process water having ammonia mixed therewith through the bed of weak base anion exchange resin during a regeneration cycle.

2. A process as set forth in claim 1 including regenerating the strong acid cation resin by passing a solution containing sulfuric acid through the bed of strong acid cation exchange resin.

3. A process as set forth in claim 2 including passing rinse water through the strong acid cation exchange resin after the step of passing the solution containing sulfuric acid through the strong acid cation exchange resin.

4. A process as set forth in claim 1 wherein said product water is subsequently passed through a strong acid cation exchange resin bed followed a weak base anion exchange resin bed.

5. A process as set forth in claim 1 wherein a total time in which the steps of passing the nitrate containing water through the bed of strong acid cation exchange resin and passing said effluent from the bed of weak acid cation exchange resin through the weak base anion exchange resin is equal to a total time in which the steps of regenerating the bed of strong acid cation exchange resin and regenerating the bed of weak base anion exchange resin are conducted.

6. A process as set forth in claim 5, wherein said total time of regenerating the bed of strong acid cation exchange resin and the bed of weak base anion exchange resin exceeds four hours.

7. A process as set forth in claim 5 wherein said total time of regenerating the bed of strong acid cation exchange resin and the bed of weak base anion exchange resin exceeds eight hours.

8. A process as set forth in claim 1 wherein the collected portion of product water having ammonia mixed therewith has a volume of 0.5 to 2 times the volume of the bed of weak base anion exchange resin and contains over 95% of the nitrate removed from the water.

9. A process as set forth in claim 1 including collecting the regenerant solution that has passed through the weak base anion exchange resin that has a concentration of total dissolved solids that exceeds a concentration of total dissolved solids of process water.

10. A process as set forth in claim 1 including the bed of weak base anion exchange resin with a bed of a strong acid cation exchange resin in a closed loop, and recirculating a portion of the process water through the closed loop until an ammonia concentration in an effluent from the weak base anion exchange resin bed is less than 10 ppm.

11. A process as set forth in claim 1 wherein said step of periodically regenerating the weak base anion exchange resin bed is performed when a nitrate concentration of an effluent from the weak base anion exchange resin bed is equal or greater than a nitrate concentration of the nitrate containing water.

* * * * *